United States Patent [19]

Hunter et al.

[11] 4,310,882

[45] Jan. 12, 1982

[54] DAS DEVICE COMMAND EXECUTION SEQUENCE

[75] Inventors: Paul W. Hunter; Alexander E. Malaccorto, both of San Jose, Calif.

[73] Assignee: International Business Machines Corporation, Armonk, N.Y.

[21] Appl. No.: 973,827

[22] Filed: Dec. 28, 1978

[51] Int. Cl.³ .............................................. G06F 13/00
[52] U.S. Cl. .................................................... 364/200
[58] Field of Search ... 364/200 MS File, 900 MS File, 364/300; 360/70, 71, 72, 73, 74, 75, 76, 77, 78

[56] References Cited

U.S. PATENT DOCUMENTS

| | | | |
|---|---|---|---|
| 3,346,852 | 10/1967 | Smeltzer | 364/200 |
| 3,480,917 | 11/1969 | Day | 364/200 |
| 3,573,743 | 4/1971 | Hadd et al. | 364/200 |
| 3,898,623 | 8/1975 | Cormier | 364/200 |
| 3,936,804 | 2/1976 | Bachman | 364/200 |
| 3,956,738 | 5/1976 | Tessera | 364/200 |
| 4,092,732 | 5/1978 | Ouchi | 364/200 |

OTHER PUBLICATIONS

Opdahl, Jr. "New Command for Improving I/O Channel Buffering", IBM Tech. Disc. Bull, vol. 19, No. 11, Apr. 1977, pp. 4235-4236.

*Primary Examiner*—Gareth D. Shaw
*Assistant Examiner*—Thomas M. Heckler
*Attorney, Agent, or Firm*—Walter J. Madden, Jr

[57] ABSTRACT

A method and means are provided to increase the effective data transfer rate between a direct access storage device (DASD) and a central processing unit (CPU) communicating with the DAS device through a channel and a DASD control device.

A command issued to the AS subsystem which requires mechanical motion in the DAS device is stored in the subsystem and the subsystem provides a response to the channel indicating that the command has been carried out, without actually carrying out the command. The channel responds by issuing one or more additional commands in the chain to the subsystem which may be carried out without mechanical motion. When a command is issued to the subsystem which again requires mechanical motion of the device, the control device causes the stored command to be executed essentially simultaneously with the newly received command.

This execution of the stored command out of its normal sequence and in parallel with another command involving mechanical motion of the DAS device decreases the time required to perform operations with the DASD subsystem.

10 Claims, 3 Drawing Figures

COMMAND WORD

DAS DEVICE COMMAND EXECUTION SEQUENCE

DESCRIPTION

TECHNICAL FIELD

This invention relates to methods and apparatus for controlling the transfer of data between a Central Processing Unit (CPU) and a Direct Access Storage Device (DASD), through a channel and a control device, and relates more particularly to such methods and apparatus for reducing the amount of time the channel and control device are involved in such transfer.

BACKGROUND ART

The access of data on contemporary DASD units, such as disk files, has been accomplished through the use of a set of commands which direct the device to proceed to a specific geometric location and then process selected units of data found at that location. More specifically for example, in the IBM System/360 and System/370 CPU's, a CPU issues a series of commands, identified in 360/370 architecture as Channel Command Words (CCW's), which control the operation of the associated DASD.

The transfer of data between a 360/370 CPU and the accessed locations of DAS devices utilizes a physical path connection involving a channel, a DAS control device or unit communicating with the channel on one side in an asynchronous relationship and selected DAS devices on the other side. The operating system of the CPU initiates the transfer by a START I/O instruction, causing control to be relinquished to a series of CCW's. A sequence or chain of CCW's is then sent from the CPU over the channel to the control device for selecting and accessing the storage device as well as effectuating the data movement across the interface.

Further information about this type of operation between a channel and control unit is contained in the publication "IBM System 360 and System 370 I/O Interface Channel to Control Unit, Original Equipment Manufacturer's Information", IBM Publication No. GA22-6974.

Each CCW is separately resident in the CPU main store and must be fetched therefrom by the channel program, decoded and transmitted to the control function for execution on the DASD. Each connection between the CPU and channel consumes time, referred to as channel turn-around time, and the cumulative turn-around time for a string of CCW's such as identified above can be a significant factor in the operation of the overall system. As the rate at which DAS devices are capable of transmitting data increases, the channel turn-around of transmitting data increases, the channel turn-around time becomes a factor limiting the effective data transfer rate between the CPU and the DASD.

A number of CCW's involve disconnection of the DAS device from the control device during their execution. Such commands generally are of the type which involve mechanical motion of the DAS device, and the control device disconnects from the DAS device during this motion period so as to free the control device for performing tasks with other DAS devices. One of such commands is the SEEK command, in which the DAS device is directed to position a specific one of its magnetic transducers over a specific track or cylinder of the device. Unless the actuator is already positioned over the desired cylinder, a SEEK command requires mechanical motion of the device actuator to reach the designated cylinder. Heretofore, a SEEK command was executed by initiating the required actuator motion and then having the control device disconnect from the DAS device while the actuator was moving to its new position. When the actuator reached the required cylinder, the DAS device signalled the control device, requesting reconnection. Upon reconnection, the DAS subsystem was prepared to receive and execute another CCW. A common CCW which might follow at some time after a SEEK command is the command SET SECTOR. This command, utilized on DAS devices equipped with the Rotational Position Sensing feature, involves obtaining from CPU main storage the number of the disk sector which is closely adjacent to the sector location of the desired data, transferring this information to the DAS device, and then disconnecting the control device from the DAS device while waiting for the desired sector on the disk to approach the read/write position. The control device, of course, is free to perform tasks with other DAS devices during this latency period for the DAS device.

The delays created by the necessity to wait for the mechanical motion to be completed in executing these two commands represents a substantial portion of the total time required to execute many command chains.

The prior art includes U.S. Pat. No. 3,480,917, Day; U.S. Pat. No. 3,936,804, Bachman; U.S. Pat. No. 3,956,738, Tessera; and the IBM 3850 Mass Storage System.

The Day patent treats the problem of overlap processing using facilitated or prefetched transfers. Bachman and Tessera illustrate the diversity of overlap processing as between two instructions (Tessera) and in the combining of a data transformation with a MOVE instruction (Bachman). In substance, the prior art teaches, notwithstanding the pattern of overlap, that the prefetching of data across a channel interface involves taking the data elements of the response in sequence and operating upon them. In contrast, in this invention the method involves taking a selective type of CCW out of sequence order and deferring its execution until receipt of a second predetermined type of subsequent CCW.

The IBM 3850 Mass Storage System queues CCW's for different device addresses, but with no more than one CCW queued per device. Thus, the IBM 3850 Mass Storage System does not queue CCW's for a device in order to perform later execution out of normal sequence for the same device address as is the case in this invention.

THE INVENTION

In accordance with the present invention, a CCW which requires mechanical motion of the DAS device, such as a SEEK command, is not executed at the time it is issued. Instead, the control device, after checking the command for validity and storing the command, and while still connected to the channel, indicates to the channel that the command has been executed. The channel responds by issuing one or more subsequent commands in the chain. If one or all of these subsequent commands are of the type which do not require mechanical motion of the DAS device, they are executed in sequence by the control device. Meanwhile, the SEEK command remains stored in the control device and is not executed.

When the channel issues a command which again involves mechanical motion of the DAS device, such as the command SET SECTOR, the control unit responds by causing execution of this new command as well as the stored SEEK command. Thus, the SEEK command execution is delayed and performed out of its normal sequence in the command chain so that it can be executed at the same time as another command requiring mechanical motion of the DAS device. This results in execution of the SEEK and SET SECTOR commands essentially in parallel, rather than sequentially as in the prior art, thereby reducing the time consumed in executing these commands.

A byproduct of this invention is the reduction of the number of connection and reconnection steps between the channel, the control device and the DAS device, thus increasing the efficiency of the data transfer event between the CPU and the DAS device.

DESCRIPTION OF THE BEST MODE AND INDUSTRIAL APPLICABILITY

Figure 1:
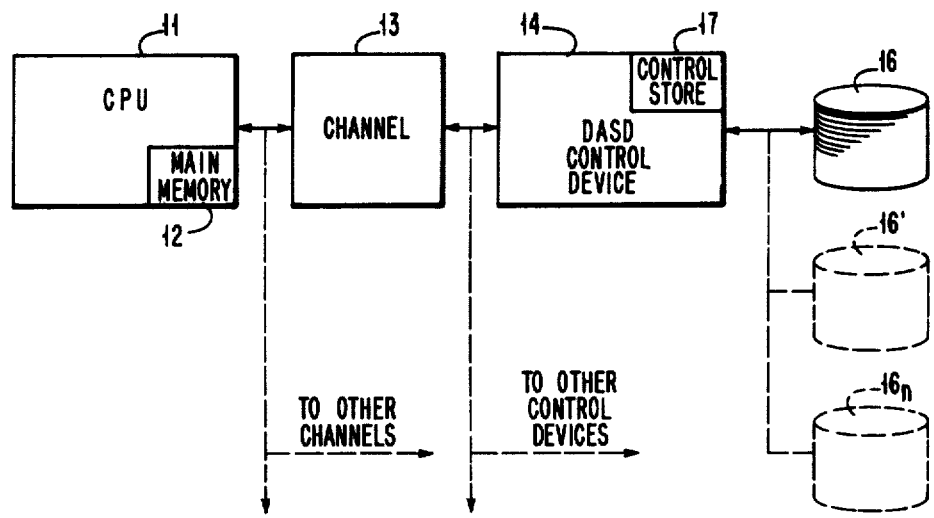
FIG. 1 is a schematic drawing showing a typical computer system in which the present invention may be employed.

Referring to FIG. 1, there is shown a schematic representation of a system in which the present invention may be employed. This system includes a central processing unit (CPU) 11 having a main memory portion 12. CPU 11 is shown connected to a channel 13, which in turn is connected to a DASD control device 14. As is well known in the art, channel 13 may have other control devices connected to it in addition to control device 14, and CPU 11 similarly may have other channels connected to it in addition to channel 13. Device 14 may be a stand-alone DASD control unit, such as the IBM 3830, such as described in IBM Publication No. GA26-1617-5 entitled "Reference Manual for IBM 3830 Storage Control Model 2," or may be a control device which is physically integrated into another unit such as CPU 11, such as an Integrated Storage Control, or may be an Integrated File Adaptor which is integrated into the CPU and shares some hardware with the CPU. One or more DAS devices 16 are connected to control device 14, up to a number 16n.

In operation, data is transmitted between CPU 11 and DAS devices 16 through channel 13 and control device 14. Originally, data from CPU 11 is recorded on DAS devices 16, and subsequent operations may involve the reading of this recorded data back to CPU 11, the modification of the recorded data under the control of CPU 11, or the recording of additional data on devices 16.

Control of the data transfer is performed by software or programming resident in CPU 11. This control is implemented by the execution of CCW's which are stored in main memory 12 of CPU 11 and which are retrieved and executed as required by channel 13. In practice, when an operation is to be performed involving a DAS device 16, CPU 11 issues a START I/O instruction which causes channel 13 to go to a predetermined location in main memory 12 to locate a Channel Address Word (CAW). This CAW identifies for channel 13 the location in main memory 12 at which the first CCW to be executed is stored. Channel 13 then proceeds to this location to fetch and execute the first CCW, subsequently proceeding to fetch and execute subsequent CCW's necessary to perform the required DAS operation.

DASD control device 14 may include a microprocessor capable of executing microprogram instructions which are stored in a memory or control store portion 17 of device 14. As is well known, control store 17 includes a number of addressable memory locations, some of which are utilized for microprogram instructions and others of which are available for storing the values of other parameters used in the operation of device 14.

Figure 2:
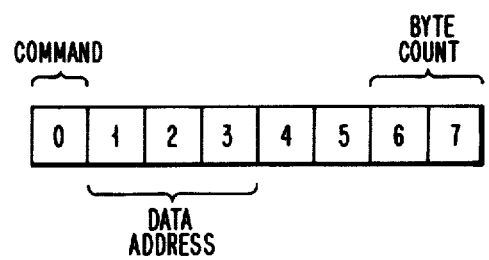
FIG. 2 is a representation of a command word used in the invention.

FIG. 2 shows the arrangement of a typical channel command word as employed in IBM System/360 and System/370 architecture. The command consists of 8 bytes, 0-7, each byte containing 8 bits. The first byte, byte 0, is identified as the operation byte and is utilized to define the operation to be carried out by this command. In the case of a SEEK command, byte 0 would be decoded to specify this operation.

Bytes 1-3 of the command are identified as the data address bytes and serve to define the location in CPU main memory 12 where the desired address or other information relative to the command is located. In the case of a SEEK operation, bytes 1-3 of the command specify the location in main memory 12 where six bytes of information defining the DASD address to which the SEEK is directed are located. Normally, this address information includes DASD cylinder and head identification representing a specific DASD cylinder and a specific one of the multiple heads associated with each DAS device.

Bytes 6-7 of the command are identified as Byte Count bytes and provide an indication of the number of bytes which are involved in the operation to be conducted. In the case of a SEEK command, the byte count is six, representing the six bytes of address information identifying the desired cylinder, head and other record information on the addressed DAS device.

In a system which does not employ the present invention, the operation for a SEEK command would be as follows. After decoding the CCW, channel 13 would fetch from the location in main memory 12 specified by data address bytes 1-3 of the SEEK command, the six bytes of information identifying the seek address on the addressed DAS device. After transfer of this address information to control device 14, device 14 checks this address for validity. Such validity check would include determining that the cylinder and head specified in the address actually exist on the addressed device. An additional validity check which may be conducted is to determine whether a Seek operation is allowed on the addressed DAS device. In some cases, a command SET FILE MASK is used to prohibit some write, diagnostic or seek operations on certain DAS devices, and if such a mask prohibiting a seek operation had been issued for the addressed DAS device, control device 14 would reject the command and signal an error condition.

However, if the command is valid, Control device 14 would initiate the access motion in the selected DAS device 16 and then disconnect from the DAS device while the actuator was completing its required motion. At this time, the signal "Channel end" is sent to the channel indicating to the channel that the last command has been executed by control device 14 and that device 14 is ready for the next command.

Upon completion of the motion required to reach the SEEK address, the DAS device signals device 14 that it has completed the seek and requests reconnection to device 14 for further processing of the command chain. Upon reconnection, the signal "Device End" is sent to the channel indicating that the device 16 is available for subsequent use.

If Command Chaining is employed, channel 13 may issue a new CCW without requiring CPU intervention and the issuance of a new START I/O instruction. In any event, one or more new CCW's which do not require mechanical motion, such as NO OP, SENSE, SET FILE MASK, may be issued and executed by the Control device 14.

At some point thereafter in the chain, the command SET SECTOR may be issued. This command, like the SEEK command, includes an operation byte which identifies the command and a three byte data address portion identifying the location in main memory 12 at which the desired sector number is stored. As discussed above, this sector number identifies a sector on the selected DAS device which is slightly in advance (usually two sectors) of the sector containing the start of the record which is to be the subject of the DAS operation. After checking the sector number for validity, it is transmitted to the DAS device, control device 14 disconnects from device 16, and "Channel End" is presented to the channel.

Control device 14 is then free to service other DAS devices while waiting for the designated sector to rotate under the read/write position. When the designated sector reaches the desired location, device 16 notifies control device 14 and requests reconnection. When reconnected, Control device 14 attempts to reconnect to channel 13 and, if successful, the "Device End" signal is sent to the channel. One or more subsequent CCW's, such as READ or WRITE, may then be issued and executed to complete the command chain.

From the above description, it can be seen that the two commands which require mechanical motion of the DAS device, SEEK and SET SECTOR, are executed separately with no overlap, thus maximizing the time required for their completion and resulting in a subtantial amount of connection and disconnection of the channel.

Figure 3:
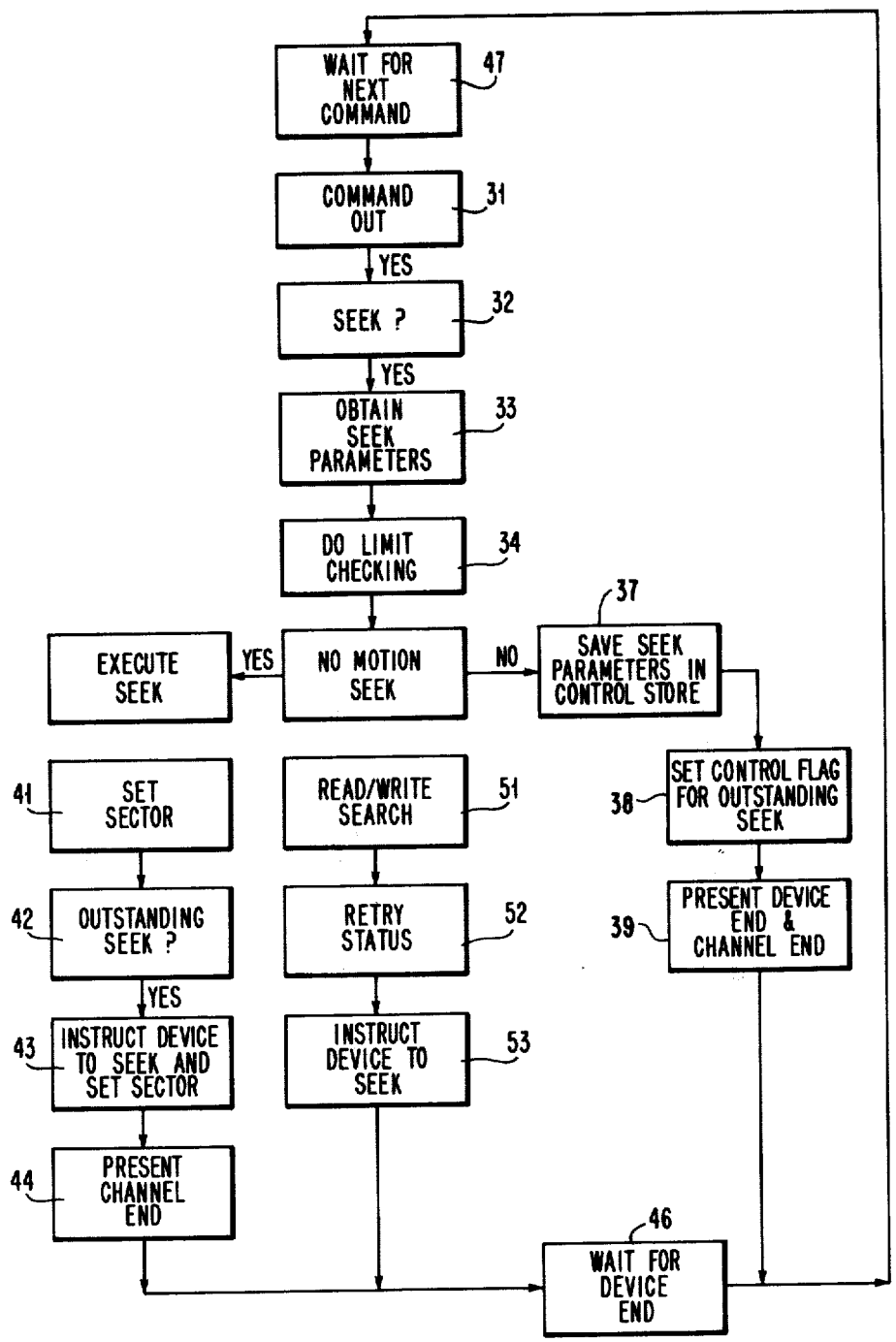
FIG. 3 is a flow chart illustrating the operation of the present invention.

The operation of the present invention may be understood by reference to the flow chart of FIG. 3. Box 31 represents the receipt of a command by control device 14 and if this command is SEEK, as indicated by box 32, control device decodes the information, box 33, and checks the seek parameters, box 34, for validity, as discussed above, including valid seek address and no violation of file mask parameters.

If the SEEK command does not require any actuator motion, such as would be the case where the seek involved only the switching from one transducer to another in the same cylinder at which the transducers are located, the SEEK is executed immediately, box 36.

However, if the SEEK command involves mechanical motion of the actuator, the SEEK parameters are stored in control store 17 of control device 14, box 37, and a control flag is set, box 38, indicating that a SEEK is outstanding. The control device then sends "Channel end" and "device end" back to the channel, box 39, notifying the channel that both control device 14 and the selected DAS device 16 are available for the next command. This is, in effect, "fooling" the channel, since the SEEK operation has not even been initiated by device 14. Under operation prior to the present invention, as discussed above, device 14 would disconnect from device 16 after initiation of the seek and the "device end" signal would not appear until completion of the seek.

With the present invention, channel 13 having received both "Channel end" and "device end" signals, other commands may be issued to the DAS device. As discussed above, such commands may be NO OP, SENSE FILE MASK, etc., which commands would be executed by control device 14 without execution of the earlier stored SEED command.

When the command SET SECTOR is issued in the chain, box 41 of FIG. 3, device 14 will determine if there is an outstanding seek operation to be performed, box 42, and if so, will initiate both the stored seek operation and the newly received SET SECTOR command, box 43. The seek and set sector operations then commence in parallel, thus overlapping in time as they are carried out.

After initiating the parallel seek and set sector operations, control device 14 disconnects from DAS device 16, presents "Channel end" to the channel, box 44, and is available for servicing other DAS devices 16. When the seek and set sector operations are completed, "device end" is signalled, box 46, and the system is ready for the next command, box 47.

Thus, in the present invention, one DAS command which involves mechanical motion of a DAS device is not executed at the time of issuance; instead, it is stored and executed out of its normal sequence with another command whose execution also involves mechanical motion of the DAS device. These commands involving mechanical motion are executed essentially in parallel, thus reducing the overall time required for their execution and improving the system performance characteristics.

This also reduces the number of connection and reconnection steps between the channel, control unit and DAS device, as discussed above, reducing the amount of "channel busy" time and increasing the data transfer efficiency.

In the above description of the present invention, it was assumed that the SET SECTOR command was issued prior to a READ, WRITE or SEARCH command. If this is not the case, that is, if a READ, WRITE or SEARCH command is received after an unexecuted SEEK command and without a SET SECTOR command, the invention operates as follows. When such a READ, WRITE or SEARCH command is received, box 51, a "command retry" procedure is invoked, box 52. This procedure involves the disconnection of device 14 from channel 13 after signalling the retry status. Device 14 then initiates the stored SEEK operation, box 53, and upon completion of the seek, the "device end" signal is given. This causes the system to reissue or "retry" the prior READ, WRITE or SEARCH command, and this command will then be executed in the normal manner.

If a SEEK command is the last command in a chain, control device 14 will signal "channel end" to the channel and disconnect therefrom. The actuator motion required for the seek operation will be initiated. At the completion of the seek motion, the "device end" signal will be presented to the channel only if "busy" was presented during the actuator motion.

We claim:

1. A method for minimizing the time associated with operating a direct access storage device in disconnected mode from a channel in response to sequentially issued channel commands which are applied to a control device intercoupling the channel to the storage device,
   a new command for said direct access storage device being issued after execution of the preceding command for said storage device, said control device and said direct access storage device normally presenting an ending sequence to said channel after execution of each said command, said direct access storage device operating in connected mode with said channel when receiving said commands, some of said commands involving mechanical motion of said storage device, said storage device operating in said disconnected mode when executing said commands which involve mechanical motion; comprising the steps of:
   storing within said control device a first issued command involving mechanical motion of said storage device, without executing said first issued command while signalling said channel that said first command has been executed so that said channel remain connected to said storage device; and
   responsive to the next issued command involving mechanical motion of said storage device, executing said stored first command essentially in parallel with said next command.

2. A method in accordance with claim 1, including the step of presenting a premature ending sequence indicative of execution of said first command after storing of said first command.

3. A method for minimizing the time associated with operating a direct access storage device in disconnected mode from a channel in response to sequentially issued channel commands which are applied to a control device intercoupling the channel to the storage device,
   a new command for said direct access storage device being issued after execution of the preceding command for said storage device, said control device and said direct access storage device normally presenting an ending sequence to said channel after execution of each said command, said direct access storage device operating in connected mode with said channel when receiving said commands, some of said commands involving mechanical motion of said storage device, said storage device operating in said disconnected mode when executing said commands which involve mechanical motion; comprising the steps of:
   storing within said control device a first issued command involving mechanical motion of said storage device, without executing said first issued command while signalling said channel that said first command has been executed so that said channel remain connected to said storage device;
   executing at least one additional command which does not involve mechanical motion of said storage device; and
   responsive to the next issued command involving mechanical motion of said storage device, executing said stored first command essentially in parallel with said next command.

4. A method in accordance with claim 3, including the step of executing a plurality of additional commands between the execution of said first and said next commands.

5. A method in accordance with claim 3, in which said first command involves mechanical motion of an actuator of said storage device.

6. A method in accordance with claim 3, in which said next command involves a rotational delay of said storage device.

7. A method for minimizing the time associated with operating a direct access storage device in disconnected mode from a channel in response to sequentially issued channel commands which are applied to a control device intercoupling the channel to the storage device,
   a new command for said direct access storage device being issued after execution of the preceding command for said storage device, said control device and said direct access storage device normally presenting an ending sequence to said channel after execution of each said command, said direct access storage device operating in connected mode with said channel when receiving said commands, some of said commands involving mechanical motion of said storage device, said storage device operating in said disconnected mode when executing said commands which involve mechanical motion; comprising the steps of:
   storing within said control device a first issued command involving mechanical motion of said storage device, without executing said first issued command while signalling said channel that said first command has been executed so that said channel remain connected to said storage device;
   presenting a premature ending sequence to said channel indicative of execution of said first command;
   executing at least one additional command which does not involve mechanical motion of said storage device; and
   responsive to the next issued command involving mechanical motion of said storage device, executing said stored first command essentially in parallel with said next command.

8. A method in accordance with claim 7, including the step of executing a plurality of additional commands between the execution of said first and said next commands.

9. A method in accordance with claim 7, in which said first command involves mechanical motion of an actuator of said storage device.

10. A method in accordance with claim 7, in which said next command involves a rotational delay of said storage device.

* * * * *